8706X
P. Cooper
Grinding Glass, &c.
Patented Mar. 24, 1835
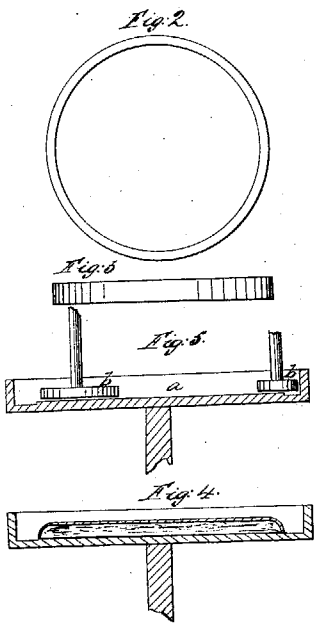
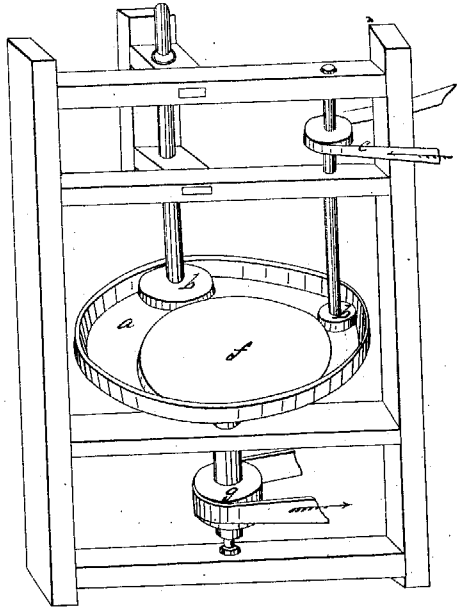
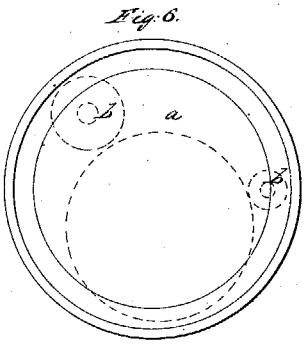
N. PETERS, PHOTO-LITHOGRAPHER, WASHINGTON, D. C.

8706X Mar. 24. 1835 85.

Peter Cooper . New York City

Letters Patent

The Schedule referred to in these Letters Patent and making part
of the same containing a description in the words of the said Peter
Cooper himself of his improvement in the art of grinding Stone
Glass and metallic surfaces to perfect and polished Planes To all whom these presents shall come.
Be it known that I Peter Cooper of the City County and State of
New York, has invented a new and useful improvement in the
art of grinding surfaces to perfect and polished Planes and that the
following is a full and faithful description of the construction and
operation of said Machine as invented by me.
This improvement consists in the successful application of a horizon
tal tub wheel and fixtures as herein after described to the grinding
perfect and polished plane surfaces on Marble. Stone Glass metals
&c. The construction of the tub wheel and its fixtures is as follows.
Upon the top of a perpendicular shaft resting below in its pivot
and well secured about one foot from its upper end is to be firmly fastened
a horizontal tub wheel made of cast Iron or other material & which
tub wheel requires to be about one third larger in diameter than the
diameter of thing to be ground and polished if already circular on its
edge or to the circular rim herein after described to which things not
round are to be secured. This Tub wheel has a perpendicular rim
rising about six inches above its upper plane surface, of lead or
other material. the upper surface of the tub wheel is to be a perfect
plane having a broad groove around it next the rim said groove to
be about six inches wide and two deep. Placed within the rim
& near the plane of said Tub wheel but so as not to touch said wheel
and rim is to be suspended from and each revolving in a descend
ing shaft two wooden or other pullies. one pulley to be one fourth Drawings [illegible]

8106X the diameter of tub wheel aforesaid, the other pulley to be about one
twelfth the diameter and to be near the rim and plane of said tub
wheel
and distant from the first pulley about one third the circumference
of the rim of said tub wheel. this last pulley to be driven by a wheel
and band at about one quarter less speed ~~speed~~ than the motion
of the rim of the tub wheel aforesaid. - All substances to be ground
to plane surfaces if not round already are to be attached in any
practical way within a circular rim of cast iron or other material
said rim to be about one inch thick if made of cast iron and about
four inches high and in diameter of rim about two thirds the diam
eter of the said tub wheel. things are to be so attached to said rim
that when placed in the tub wheel aforesaid the surface of the
thing to be ground shall lay on the upper plane surface of the tub
wheel. For the purposes of polishing the plane surface of the tub wheel is for
the time to be covered with a leather cushion. or for practical purposes the
constructed
above cushion may be attached to a similar tub wheel & fixtures as herein
before described; the said Cushion to have a surface as near a plane as
possible. The construction completed the tub wheel & fixtures are put
into operation by placing the article if round already and of proper
size as a marble Table top &c. or else the circular rim before mentioned
with the things to be ground and polished fastened within it upon
the pl[illegible] of the tub wheel having sand and water on its surface.
tub
The wheel is now to be set in motion by means of a wheel and band
upon the perpendicular shaft aforesaid and propelled by steam or other
power. the tub wheel to revolve toward the small pulley aforesaid.
Now as the table top or circular rim revolves with the tub wheel it
comes in contact with the pulleys aforesaid and is by them kept sta
tionary again as the small pulley is at the same time put in mo-
tion revolving in the direction from the rim of the tub wheel to the
table top &c giving to the table top or rim a second rotary motion
and thus gradually reducing the Table top &c to a perfect plane -
When the Table top &c is to be removed to the tub wheel with the cushioned
plane to receive its final polish by coating said cushion with any

87067X proper polishing material as in ordinary use. The motion of the peul ley driven as aforesaid is to be so regulated as to give the table top &c the true motion so as to wear the upper plane surface of tub wheel equally over its whole surface. and thus by its own wear to always keep the upper plane surface of the tub wheel aforesaid a perfect level plane.

The improvements in the above invention for which your petitioner claims Letters Patent. are (first. the successful application of a tub wheel with two regulating pullies as herein before described one of which pullies being driven by a wheel and band thus giving to the marble table top or other thing to be ground the required rotary motion so as to cause the upper plane surface of the tub wheel aforesaid to wear equally over its whole surface and thus by its own wear to always keep a perfect level plane and secondly. the successful application of the tub wheel and pullies as herein before described to the grinding perfect and polished surfaces on marble and marble table tops glass and plate glass. stones of all kinds. lythographic stones, and every species of metal or metallic combination)

Peter Cooper

Witnesses
Edw C Cooper
Ebenezer Conklin

1106 [illegible]

Ex
Ch